United States Patent
Bridl

(10) Patent No.: US 11,549,618 B2
(45) Date of Patent: Jan. 10, 2023

(54) TUBE

(71) Applicant: TUPACK Verpackungen Gesellschaft m.b.H., Vienna (AT)

(72) Inventor: Karl Bridl, Vienna (AT)

(73) Assignee: TUPACK VERPACKUNGEN GESELLSCHAFT M.B.H., Vienna (AT)

( * ) Notice: Subject to any disclaimer, the term of this patent is extended or adjusted under 35 U.S.C. 154(b) by 0 days.

(21) Appl. No.: 17/083,728

(22) Filed: Oct. 29, 2020

(65) Prior Publication Data

US 2021/0148491 A1    May 20, 2021

(30) Foreign Application Priority Data

Nov. 15, 2019 (EP) .................................. 19020640

(51) Int. Cl.
*F16L 11/12* (2006.01)
*F16L 11/04* (2006.01)

(52) U.S. Cl.
CPC .......... *F16L 11/12* (2013.01); *F16L 2011/047* (2013.01)

(58) Field of Classification Search
CPC ... F16L 9/12; F16L 9/121; F16L 9/123; F16L 9/14; B32B 1/08; B29D 23/00
USPC ...... 138/137, 140, 141; 428/35.7, 36.6–36.9, 428/36.91, 34.1, 421, 422, 500
See application file for complete search history.

(56) References Cited

U.S. PATENT DOCUMENTS

| | | | | |
|---|---|---|---|---|
| 5,238,148 A * | 8/1993 | Holoubek | ............... | B32B 27/08 428/34.3 |
| 5,316,826 A * | 5/1994 | Kotani | ............... | B32B 27/32 428/220 |
| 6,383,589 B1 * | 5/2002 | Horan | ............... | B32B 1/08 428/168 |
| 6,680,094 B2 * | 1/2004 | Kikuchi | ............... | C08L 51/04 428/480 |
| 6,878,774 B2 * | 4/2005 | Kikuchi | ............... | B32B 27/18 525/183 |
| 6,884,482 B2 * | 4/2005 | Hayashi | ............... | C08J 7/043 428/36.7 |
| 7,291,369 B2 * | 11/2007 | Fukushi | ............... | B32B 27/28 428/35.7 |
| 8,298,636 B2 * | 10/2012 | Kani | ............... | B32B 27/306 428/36.9 |
| 2004/0081787 A1 * | 4/2004 | Nomura | ............. | C08G 18/3206 428/36.91 |
| 2005/0217747 A1 * | 10/2005 | Buriak | ............... | C08L 23/0815 138/140 |
| 2009/0087606 A1 * | 4/2009 | Julien | ............... | B32B 27/304 428/36.7 |
| 2009/0288728 A1 * | 11/2009 | Sumi | ............... | B32B 27/285 138/137 |
| 2011/0220534 A1 * | 9/2011 | Fussnegger | ............ | C08F 210/02 427/209 |
| 2015/0020841 A1 | 1/2015 | Kerman et al. | | |
| 2017/0074427 A1 * | 3/2017 | Rosenberg | ............ | B32B 27/306 |
| 2019/0016100 A1 * | 1/2019 | Limatibul | ................ | B32B 7/12 |

FOREIGN PATENT DOCUMENTS

| | | |
|---|---|---|
| EP | 0652839 B1 | 7/1997 |
| JP | 2003-267431 A | 9/2003 |
| JP | 2006-240666 A | 9/2006 |
| JP | 2014-097629 A | 5/2014 |
| WO | 2006/013276 A1 | 2/2006 |

OTHER PUBLICATIONS

Third Part Observation dated Mar. 16, 2022, issued in corresponding European Patent Application No. 19020640.9 (6 pgs.).
European Search Repod dated Apr. 29, 2020, issued in corresponding European Patent Application No. 19020640 (2 pgs.).

* cited by examiner

*Primary Examiner* — Patrick F Brinson
(74) *Attorney, Agent, or Firm* — Pillsbury Winthrop Shaw Pittman, LLP

(57) ABSTRACT

A tube for receiving a liquid or pasty product comprising a multilayered tube jacket, the tube jacket having one or more outer layer(s) made of polyolefin, one or more inner layer(s) made of polyolefin and a barrier layer arranged between the outer layer(s) and the inner layer(s), wherein the barrier layer consists of an ethylene-vinyl alcohol copolymer (EVOH), and wherein the ethylene-vinyl alcohol copolymer of the barrier layer has an ethylene content of <35 mol % and the thickness of the barrier layer is ≤25 μm.

12 Claims, No Drawings

TUBE

CROSS-REFERENCE TO RELATED APPLICATIONS

This application claims priority to EP 19 020 640.9, filed Nov. 15, 2019, the entire contents of which are hereby incorporated by reference in full.

The invention refers to a tube for receiving a liquid or pasty product comprising a multilayered tube jacket, the tube jacket having one or more outer layer(s) made of polyolefin, one or more inner layer(s) made of polyolefin and a barrier layer arranged between the outer layer(s) and the inner layer(s), wherein the barrier layer consists of an ethylene-vinyl alcohol copolymer (EVOH).

Plastic tubes are used, for example, in the field of cosmetics and personal care as containers for liquid or pasty products. For example, tubes are used to hold toothpaste, creams and the like. In addition, tubes are used in the pharmaceutical sector to hold creams or gels that have been mixed with active pharmaceutical ingredients.

In the case of plastic tubes, however, there is the risk that the products stored in the tube or their volatile constituents will diffuse through the plastic. At least if the product is stored for a longer period, this can lead to drying out of the product, a loss of flavorings or a reduced effectiveness of active pharmaceutical ingredients.

Plastic tubes, in which diffusion of the tube contents or parts thereof through the tube jacket is to be reduced, have a tube jacket which consists of an outer layer made of a polyolefin, an inner layer also made of a polyolefin and a barrier layer. The barrier layer can consist of an ethylene-vinyl alcohol copolymer (EVOH). The tube shoulder is connected to a tube jacket produced in this way. This tube shoulder also consists of a polyolefin and is either manufactured as a separate part and then welded to the tube jacket or molded onto the tube jacket by injection molding.

In addition to the requirement for a sufficient barrier effect, efforts are made to minimize the weight of plastic tubes. On the one hand, this reduces transport costs and, on the other hand, reduces material consumption, which in turn reduces the environmental impact. The tube weight can be reduced, for example, by choosing a thin jacket. However, this makes the tube potentially unstable. In addition, the thinner the tube jacket, the more likely it is that components of the tube contents can diffuse through the tube jacket.

The invention is therefore based on the object of providing a tube which has the lowest possible weight, but at the same time is dimensionally stable and has the best possible barrier properties.

To solve this object, a tube of the type mentioned is developed according to the invention in such a way that the ethylene-vinyl alcohol copolymer (EVOH) of the barrier layer has an ethylene content of <35 mol % and the thickness of the barrier layer is ≤25 µm.

By choosing a certain material for the barrier layer, namely an ethylene-vinyl alcohol copolymer with an ethylene content of <35 mol %, the invention makes it possible to form a tube that is both lightweight and sufficiently stable. The invention makes use of the effect that an ethylene content of <35 mol % ensures, on the one hand, an improved barrier property of the barrier layer and, on the other hand, greater inherent stability. It has been found that this enables a barrier layer with a thickness of only 25 µm or less without the barrier layer losing its barrier properties. In particular, the barrier property of the barrier layer according to the invention is sufficient for receiving common products in the cosmetic and/or pharmaceutical sector in order to achieve a shelf life of, for example, 1 year or more.

The thickness of the barrier layer may preferably assume any value in the range 5-25 µm, for example values of 5, 6, 7, 8, 9, 10, 11, 12, 13, 14, 15, 16, 17, 18, 19, 20, 21, 22, 23, 24 and 25 µm. The thickness of the barrier layer is preferably between 5 and 25 µm, more preferably between 5 and 20 µm, such as between 10 and 20 µm.

The ethylene content of the ethylene-vinyl alcohol copolymer of the barrier layer may preferably be <32 mol %, particularly preferably <28 mol %. The lower limit of the ethylene content may be 20 mol %, for example.

Since ethylene-vinyl alcohol copolymers do not form a mechanically strong bond with certain polyolefins, it is advantageous or necessary to provide bonding layers or adhesion promoter layers between the barrier layer and the polyolefin layers. A preferred embodiment of the invention therefore provides that a bonding layer is arranged on both sides of the barrier layer in direct contact with the same.

Preferably, the thickness of the bonding layer is 5-25 µm, preferably 10-20 µm. In particular, the thickness of each bonding layer may be selected to be equal to the thickness of the barrier layer.

In order to achieve a lightweight tube, a preferred embodiment provides that the one or more outer layer(s) has or have a total thickness of 80-300 µm.

Furthermore, it is preferably provided that the one or more inner layer(s) has or have a total thickness of 80-300 µm.

In particular, the total thickness of the tube jacket is 200-600 µm, preferably 300-400 µm or 200-400 µm. The total thickness mentioned can preferably be achieved by choosing the total thickness of the one or more outer layer(s) in the range 80-300 µm, the total thickness of the one or more inner layer(s) in the range 80-300 µm and the thickness of the barrier layer ≤25 µm, in particular 10-20 µm.

It has been shown that the barrier layer according to the invention has a sufficient barrier effect even in the case of a tube with a tube jacket thickness in the above-mentioned range.

The multilayer tube jacket can have one or two inner layers and one or two outer layers.

The multilayer tube jacket can have different sequences of plastic layers and can consist of the following layers, for example:

Inner layer—bonding layer—barrier layer—bonding layer—outer layer,

Inner layer #1—inner layer #2—bonding layer—barrier layer—bonding Layer—outer layer, Inner layer #1—inner layer #2—bonding layer—barrier layer—bonding Layer—outer layer #1—outer layer #2, Inner layer—bonding layer—barrier layer—bonding Layer—outer layer #1—outer layer #2.

The proportion of the thickness of the one or more outer layer(s) and the proportion of the thickness of the one or more inner layer(s) in the total thickness of the tube jacket can be selected according to the respective requirements. The total thickness of the one or more outer layer(s) is preferably 30-70% of the total thickness of the tube jacket. The total thickness of the one or more inner layers) is preferably 30-70% of the total thickness of the tube jacket.

As is known per se, the tube jacket is preferably produced by coextrusion.

With regard to the material of the inner and outer layer(s), any desired polyolefins can in principle be used. Examples of suitable polyolefins include polyethylene and polypropylene.

It is preferably provided here that the one or more outer layer(s) consists or consist of polyethylene (PE). It may also preferably be provided that the one or more inner layer(s) consists or consist of polyethylene (PE).

In order to further increase the inherent stability of the tube jacket, a preferred embodiment is that the polyethylene of the one or more outer layer(s) and/or of the one or more inner layer(s) has a proportion of at least 20% by weight, preferably at least 30% by weight, preferably at least 40% by weight, preferably at least 50% by weight, high-density polyethylene (PE-HD) with a specific weight between 0.935 and 0.97 g/cm$^3$. In particular, it is provided here that the tube jacket has a total proportion of at least 20% by weight, preferably at least 30% by weight, preferably at least 40% by weight, preferably at least 50% by weight of high-density polyethylene (PE-HD) with a specific weight between 0.935 and 0.97 g/cm$^3$.

The desired proportion of at least 20% by weight of high-density polyethylene (PE-HD) may be achieved, for example, by the tube jacket comprising, in addition to at least one outer and/or inner layer consisting of or containing high-density polyethylene (PE-HD), at least one inner and/or outer layer consisting of or containing a low density polyethylene (PE-LD) with a specific weight between 0.915 g/cm$^3$ and 0.935 g/cm$^3$ or at least one inner or outer layer consisting of or containing linear low density polyethylene (PE-LLD).

The outer diameter of the tube jacket may be selected depending on the desired tube volume. The tube jacket preferably has an outer diameter of 13-60 mm.

The invention is explained in more detail using the following exemplary embodiments.

EXAMPLE 1

A tube jacket with the following structure was produced by coextrusion:

| Layer | Material | Thickness |
|---|---|---|
| Outer layer | 80% PE-LLD, 20% PE-LD | 120 μm |
| Barrier layer | EVOH (EVAL F101B from EVAL Europe N.V.) with an ethylene content of 32 mol % | 20 μm |
| Inner layer | 50% PE-HD, 50% PE-LLD | 120 μm |

The outer diameter of the tube jacket was 40 mm, the jacket length 107 mm. A bonding layer (Admer NF 498E from Mitsui Chemicals Europe GmbH) with a thickness of 20 μm was each arranged between the inner layer and the barrier layer and between the outer layer and the barrier layer. The wall thickness was thus 300 μm.

EXAMPLE 2

A tube jacket with the following structure was produced by coextrusion:

| Layer | Material | Thickness |
|---|---|---|
| Outer layer | 80% PE-LLD, 20% PE-LD | 220 μm |
| Barrier layer | EVOH (EVAL F101B from EVAL Europe N.V.) with an ethylene content of 32 mol % | 20 μm |
| Inner layer | 50% PE-HD, 50% PE-LLD | 220 μm |

The outer diameter of the tube jacket was 40 mm, the jacket length 107 mm. A bonding layer (Admer NF 498E from Mitsui Chemicals Europe GmbH) with a thickness of 20 μm was each arranged between the inner layer and the barrier layer and between the outer layer and the barrier layer. The wall thickness was thus 500 μm.

EXAMPLE 3

| Layer | Material | Thickness |
|---|---|---|
| Outer layer | 80% PE-LLD, 20% PE-LD | 135 μm |
| Barrier layer | EVOH (EVAL L171B from EVAL Europe N.V.) with an ethylene content of 27 mol % | 10 μm |
| Inner layer | 50% PE-HD, 50% PE-LLD | 135 μm |

The outer diameter of the tube jacket was 40 mm, the jacket length 107 mm. A bonding layer (Admer NF 498E from Mitsui Chemicals Europe GmbH) with a thickness of 10 μm was each arranged between the inner layer and the barrier layer and between the outer layer and the barrier layer. The wall thickness was thus 300 μm.

EXAMPLE 4

A tube jacket with the following structure was produced by coextrusion:

| Layer | Material | Thickness |
|---|---|---|
| Outer layer | 80% PE-LLD, 20% PE-LD | 235 μm |
| Barrier layer | EVOH (EVAL L171B from EVAL Europe N.V.) with an ethylene content of 27 mol % | 10 μm |
| Inner layer | 50% PE-HD, 50% PE-LLD | 235 μm |

The outer diameter of the tube jacket was 40 mm, the jacket length 107 mm. A bonding layer (Admer NF 498E from Mitsui Chemicals Europe GmbH) with a thickness of 10 μm was each arranged between the inner layer and the barrier layer and between the outer layer and the barrier layer. The wall thickness was thus 500 μm.

EXAMPLE 5

A tube jacket with the following structure was produced by coextrusion:

| Layer | Material | Thickness |
|---|---|---|
| Outer layer | 80% PE-LLD, 20% PE-LD | 120 μm |
| Barrier layer | EVOH (EVAL L171B from EVAL Europe N.V.) with an ethylene content of 27 mol % | 20 μm |
| Inner layer | 50% PE-HD, 50% PE-LLD | 120 μm |

The outer diameter of the tube jacket was 40 mm, the jacket length 107 mm. A bonding layer (Admer NF 498E from Mitsui Chemicals Europe GmbH) with a thickness of 20 μm was each arranged between the inner layer and the barrier layer and between the outer layer and the barrier layer. The wall thickness was thus 300 μm.

EXAMPLE 6

A tube jacket with the following structure was produced by coextrusion:

| Layer | Material | Thickness |
| --- | --- | --- |
| Outer layer | 80% PE-LLD, 20% PE-LD | 220 μm |
| Barrier layer | EVOH (EVAL L171B from EVAL Europe N.V.) with an ethylene content of 27 mol % | 20 μm |
| Inner layer | 50% PE-HD, 50% PE-LLD | 220 μm |

The outer diameter of the tube jacket was 40 mm, the jacket length 107 mm. A bonding layer (Admer NF 498E from Mitsui Chemicals Europe GmbH) with a thickness of 20 μm was each arranged between the inner layer and the barrier layer and between the outer layer and the barrier layer. The wall thickness was thus 500 μm.

The tube jackets produced according to the specifications given in Examples 2-6 were tested with regard to their barrier properties and their inherent stability. The test of the oxygen transmission was carried out based on the following standard: DIN 53380-3 Determination of gas permeability; Part 3: Oxygen-specific carrier gas method for measuring plastic films and plastic molded parts. One side (outside) of the test specimen is exposed to test gas with a certain oxygen content under atmospheric pressure. On the other side (inside) of the specimen, which is tightly separated from the first side, the oxygen that has diffused through is "taken along" by the carrier gas ($N_2$) and transported to an $O_2$ sensor. The temperature of the sample or the sample chamber was set at 40° C. and the moisture content of the test gas was 0%.

The following $O_2$ transmission values were measured:

| Ex. | Thickness of the barrier layer [μm] | Wall thickness of the tube jacket [μm] | Ethylene content [mol %] | O2 transmission [cm3/tube/day] |
| --- | --- | --- | --- | --- |
| 2 | 20 | 500 | 32 | 0.0058 |
| 3 | 10 | 300 | 27 | 0.0029 |
| 4 | 10 | 500 | 27 | 0.0022 |
| 5 | 20 | 300 | 27 | 0.0014 |
| 6 | 20 | 500 | 27 | 0.0012 |

It was found that the tube jackets had sufficient barrier properties. In particular, the influence of the ethylene content on the barrier property of the barrier layer was shown, a comparison of Examples 2 and 3 showing that the $O_2$ transmission of the tube according to Example 3 is significantly lower, although both the thickness of the barrier layer and the wall thickness of the tube jacket in Example 2 is larger.

The invention claimed is:

1. A tube for receiving and containing a liquid or pasty cosmetic or personal care product to be dispensed, the tube comprising a multilayered tube jacket, the multilayered tube jacket having one or more outer layer(s) made of polyolefin, one or more inner layer(s) made of polyolefin and a barrier layer arranged between the one or more outer layer(s) and the one or more inner layer(s), wherein the one or more outer layer(s) has or have a total thickness of 80-300 μm, wherein the barrier layer consists of an ethylene-vinyl alcohol copolymer (EVOH), wherein the ethylene-vinyl alcohol copolymer of the barrier layer has an ethylene content of <35 mol % and a thickness of the barrier layer is ≤25 μm, and wherein the one or more outer layer(s) and/or the one or more inner layers consist(s) of polyethylene (PE), wherein the polyethylene of the one or more outer layer(s) and/or the one or more inner layers has a proportion of at least 20% by weight of high-density polyethylene (PE-HD), and wherein the high-density polyethylene (PE-HD) has weight between 0.935 and 0.97 g/cm3.

2. The tube according to claim 1, wherein the thickness of the barrier layer is between 5 and 25 μm.

3. The tube according to claim 1, wherein a bonding layer is arranged on both sides of the barrier layer in direct contact with the same.

4. The tube according to claim 3, wherein the thickness of the bonding layer is 5-25 μm.

5. The tube according to claim 3, wherein the thickness of the bonding layer is 10-20 μm.

6. The tube according to claim 1, wherein the one or more inner layers has or have a total thickness of 80-300 μm.

7. The tube according to claim 1, wherein the multilayered tube jacket has a total thickness of 200-600 μm.

8. The tube according to claim 1, wherein a total thickness of the one or more outer layers is 30-70% of a total thickness of the multilayered tube jacket.

9. The tube according to claim 1, wherein a total thickness of the one or more inner layers is 30-70% of a total thickness of the multilayered tube jacket.

10. The tube according to claim 1, wherein the multilayered tube jacket is produced by coextrusion.

11. The tube according to claim 1, wherein the multilayered tube jacket has an outer diameter of 13-60 mm.

12. The tube according to claim 11, wherein the multilayered tube jacket has an outer diameter of 25-50 mm.

\* \* \* \* \*